Oct. 12, 1943.　　W. H. KOPITKE　　2,331,702
METHOD OF MOLDING HOLLOW ARTICLES OF PLASTIC MATERIAL
Filed May 13, 1938
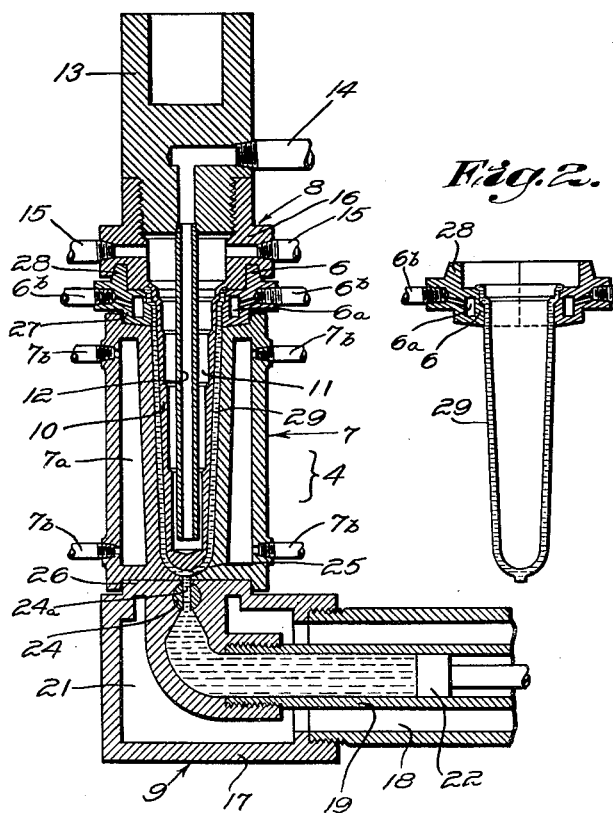
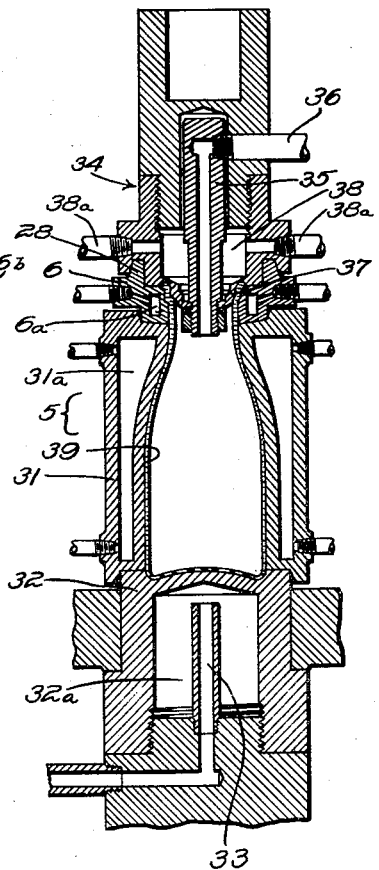
Inventor
William H. Kopitke
by Brown & Parham
Attorneys
Witness
W. B. Thayer Patented Oct. 12, 1943

2,331,702

UNITED STATES PATENT OFFICE 2,331,702

METHOD OF MOLDING HOLLOW ARTICLES OF PLASTIC MATERIAL

William H. Kopitke, West Hartford, Conn., assignor to Hartford-Empire Company, Hartford, Conn., a corporation of Delaware Application May 13, 1938, Serial No. 207,701

7 Claims. (Cl. 18—55)

This invention relates to methods of molding articles of plastic material and has particular relation to the production of hollow articles, such as containers, from organic materials adapted to be worked while in plastic condition.

The general object of the invention is to provide a novel method of the above character by the employment of which such articles of the desired shape and dimensions may be produced in a simple and efficient manner.

More particularly, it is an object of the invention to provide for accurate control of the distribution of organic plastic material in the walls of hollow articles and to form articles without seams or joints.

Generally considered, the invention involves the formation of a seamless blank or preform by injecting plastic organic material into a blank mold unit, the transfer of such blank to a blow mold unit and the blowing of the blank in said unit. The terms "injection," "injecting," or "injection molding" as understood in the art of molding organic plastic materials and as used herein mean subjecting such material to heat and pressure in an injection device and forcing it into a die or mold cavity closed, except where the material enters to fill the cavity and thus mold the plastic to predetermined size and shape. Injection molding differs from extrusion molding wherein the plastic material is shaped by forcing it through a nozzle or die into the open air or into a space which is unconfined or only partly confined by molding surfaces. Therefore, in extrusion molding a die or mold cavity is not filled and the plastic is not formed to predetermined size and shape thereby, as is the case in injection molding.

The invention may more clearly be understood by reference to the accompanying drawing which illustrates one embodiment of the novel method and apparatus, and in which drawing:

Fig. 1 is a view in central vertical section of the novel blank forming apparatus;

Fig. 2 is a similar view showing a blank as it is being transferred to a finishing mold; and Fig. 3 is a view in central vertical section of finish blowing apparatus.

The blank forming apparatus is indicated generally at 4, and the finish blowing apparatus at 5. The blank forming apparatus 4 comprises a neck mold 6, a body blank mold 7, a combined head and internal former 8 and injection apparatus 9.

The neck mold 6 and blank mold 7 preferably are divided vertically and centrally into sections for opening and closing operations (although blank mold 7 may be made in one piece if desired) and are suitably chambered or jacketed to receive temperature controlling media. Thus, neck mold 6 has a chamber 6a therein with which two pipes 6b—6b communicate and blank mold 7 a chamber 7a and four pipes, each indicated at 7b for this purpose.

Likewise, the combined head and former 8 is constructed so that a temperature controlling medium may be circulated therethrough, the former 10 thereof being hollow, as shown at 11, and having an inlet tube 12 extending toward its bottom from the top portion 13 which has inlet pipe 14 connected thereto. Outlets from chamber 11 are provided at 15—15 in the ring or shoulder portion 16 of the member 8 and in which the top portion 13 is screw-threaded as shown.

The injection apparatus 9 is shown more or less conventionally and comprises a casing 17 which provides a heating chamber 18 around cylinder 19 and the elbow 21 in the casing. Cylinder 19 contains piston which may be reciprocated by suitable means (not shown). The tapered passage 23 of elbow 21 terminates at a rotary valve 24 having a narrow duct 24a therein which, when the valve is turned so that the duct is in vertical position, communicates with a narrow opening 25 in the bottom of blank mold 7. To hold the blank mold 7 in proper position for such alignment, a boss 26 is formed on casing 17, this boss being received in a recess in the bottom of blank mold 7, as shown. A similar boss 27 on the bottom of neck mold 6 is received in a recess in the upper end of blank mold 7 and a flange 28 on the top of the neck mold is received in an undercut recess in ring portion 16 of member 8. Thus the former 10, neck mold 6 and blank mold 7 may be assembled in axial alignment with each other.

In performing my novel method, suitable material is introduced into cylinder 19 in known manner and heated and compressed therein until it is sufficiently plastic to be injected into the blank mold unit. The valve 24 may be closed during this period. With the parts assembled as shown in Fig. 1, valve 24 is moved to open position, piston 22 moved to the left and plastic material is injected through ducts 24a and 25 into the blank mold unit. The injection of material is continued until the cavity formed between the internal former 10 and the neck mold 6 and blank mold 7 is completely filled to form a blank, as indicated at 29. Valve 24 is now turned to closed position and this turning of the valve cuts off the material in duct 24a from the bottom of the blank.

When the formation of the blank is completed, it may be freed from the blank mold 7 and internal former 10 and transferred to the finishing mold unit 5 by means of the neck mold 6. The finishing mold unit 5 comprises mold 31 which preferably is made in halves for opening and closing and is chambered as shown at 31a for a temperature controlling medium. Mold 31 is closed at its bottom by bottom mold 32 which fits into the recess in the bottom of said mold, as shown, and has a chamber 32a and inlet pipe 33 for temperature controlling medium, the outlet from the chamber not being shown.

Said unit 5 also includes the blow head 34 which fits on flange 28 of neck mold 6 and has tube 35 therein for blowing air, which tube is held in place by air inlet pipe 36. The bottom central portion 37 of head 34, through which tube 35 passes, is shaped to fit the interior and lip portion of the neck of an article in cooperation with neck mold 6.

As indicated at 38, head 34 is adapted to have a temperature controlling medium circulated therethrough, as by means of pipes 38a—38a.

The neck mold 6 and blank mold 7 are of such shape as to form a blank for a milk bottle, the finishing mold 31 and bottom mold 32 being of proper design to form a milk bottle, as shown at 39.

In the forming of a blank and blowing it to final form, the temperature of the various parts is controlled by the medium circulated through the various jackets or chambers provided for this purpose. A heating medium is circulated through the chamber 18 of the injection apparatus at all times, in order to maintain a supply of plastic organic material to be injected into the blank mold unit 7. The heat from this jacket insures that a slug of material trapped in valve 24, as a result of the cut-off operation, will remain soft enough to be injected into the mold at the next operation.

The blank mold 7, the temperature of which is controlled by medium passing through chamber 7a and forming device 10 are kept as warm or as hot as the nature of the material will permit, in order to insure that the material will properly be injected into the blank mold and neck mold.

The neck mold preferably is cooled sufficiently to quickly set the neck or finish portion of the blank when it is formed, in order to avoid deforming the blank when it is transferred to the blowing unit 5.

When the blank is completed, it may be desirable or necessary to lower the temperature of blank mold 7 and former 10 to prevent them from sticking to the blank when it is desired to remove them from engagement therewith. However, it is preferred to lower the temperature of mold 7 and former 10 as little as possible, so that the maximum amount of initial heat may be retained in the blank to keep the blank plastic, so that it may be blown in mold unit 5 without or with little reheating.

In order to avoid cooling the blank so as to require an appreciable amount of reheating before blowing, I prefer to design the blank mold 7 and form 10, so as to form blanks the mold walls of which are relatively thick, because I have discovered that thicker walled material blows out more readily than thinner walled material. This permits cooling the surfaces of the blank without cooling the interior of the wall between such surfaces (plastic organic material being characterized by its low heat conductivity), which in turn enables the blank to be readily separated from mold 7 and former 10. The heat mass of the blank then acts to soften or reheat the surface portions thereof, so that the blank may be blown without externally applying heat to the blank. Thus the mold 7 and former 10 may be designed to form a relatively short and thick walled blank.

Where it is necessary or desirable to provide a relatively thin walled blank, such blank may, if necessary, be reheated externally before it is placed in the blowing unit 5, as by means of a burner or radiant heating means (not shown). In lieu of or in conjunction with such intermediate heating, the blowing air supplied through blow head 34 may be heated and a heating medium circulated through chamber 31a in finishing mold 31. In any event, it is desirable to cool mold 31, mold bottom 32 and head 34 to set the material of the bottle 39 before it is removed from the finishing mold.

The invention may be employed for the manufacture of a wide variety of shapes and sizes of hollow articles made of organic plastic material. By injection molding the blank, seamless blanks may be formed of such design as to secure the desired distribution of material in the finished blown articles. Also, the invention may be employed for making containers, the necks of which are narrower than their body portions (called "narrow neck" containers or articles), such as milk bottles as illustrated in the drawing.

The invention is not limited to the working of any particular type of organic material, but is applicable to organic material which may be rendered plastic by heat or heat and pressure, and which retains its plasticity long enough to permit it to be shaped into hollow articles. Cellulose acetate may be mentioned as an example of one type of material which may be employed in practicing the invention.

The embodiment of the invention which has been illustrated and described herein is particularly adapted to the formation of hollow articles from organic materials of the thermoplastic type of which cellulose acetate is an example. The invention may be employed in working cellulose derivatives such as cellulose esters and cellulose ethers as well as natural or synthetic gums or resins of either the thermoplastic or thermosetting types or mixtures thereof.

The temperatures of the various parts of the apparatus will be controlled or maintained in accordance with the properties of the organic material being worked. Thus in working thermoplastics, the parts will be heated where necessary or desirable to make the material plastic or workable and cooled to cause the material to set or harden; in working thermosetting materials, the parts may be heated to make the material plastic and workable initially, cooled, (or unheated) to maintain plasticity or a semi-cured condition for further working and heated to set or harden the material.

Variations may be made in the details of construction and in the method herein disclosed without departing from the scope of the claims.

Having thus described my invention, what I claim is:

1. The method of forming hollow articles of organic plastic material which comprises plasticating such material in an injection device, injection molding a blank of such plasticated material in a blank mold unit, and blowing said blank into a finished article in a finishing mold unit.

2. The method of forming hollow articles of organic plastic material which comprises plasticating such material in an injection device, injection molding a blank having a neck finished thereon in a blank mold unit comprising a neck mold and a blank mold by filling said unit with plasticated material from said device, and blowing the blank to final form in a finishing mold unit.

3. The method of forming hollow articles of organic plastic material which comprises plasticating such material in an injection device, forming a blank by injection molding of plasticated material from said device, cutting off the blank from plasticated material in said device, and blowing said blank to final shape in a finishing mold.

4. The method of forming hollow articles of organic plastic material which comprises first plasticating such material in an injection device, forming a hollow blank by injection molding such plasticated material from said device in a cavity shaped to form a hollow blank, and blowing the blank thus formed to final form.

5. The method of forming hollow articles of organic plastic material which comprises softening such material by application of heat and pressure thereto in an injection device, injection molding a seamless blank of such material in a blank mold unit, removing the blank from the blank mold before it has hardened therein and while the blank is still plastic, and blowing the plastic blank into a seamless hollow article in a blow mold.

6. The method of producing hollow articles of organic plastic material, which comprises first forming a seamless blank by molding such material in a blank mold, the temperature of said blank mold being maintained above the temperature at which said material sticks to the mold while the blank is being formed, lowering the temperature of the blank mold below the sticking temperature of the material in order to remove the blank from the blank mold, transferring the blank to a finishing mold, and subjecting the blank to the action of fluid under pressure to expand the blank into the shape of the finishing mold cavity.

7. The method of forming hollow articles of organic plastic material which comprises plasticating such material in an injection device, injection molding a blank of such plasticated material in a blank mold unit by delivery of such material from said device through the bottom end of said blank mold unit, and blowing said blank into a finished article in a finishing mold unit.

WILLIAM H. KOPITKE.